United States Patent
Bhalla (10) Patent No.: US 10,574,760 B2
(45) Date of Patent: Feb. 25, 2020

(54) COMMUNICATION BETWEEN MACHINE-TO-MACHINE SERVICE LAYERS AND TRANSPORT NETWORK

(71) Applicant: ZTE (USA) Inc., Richardson, TX (US)

(72) Inventor: Rajesh Bhalla, Gahanna, OH (US)

(73) Assignee: ZTE (USA) Inc., Richardson, TX (US)

( * ) Notice: Subject to any disclaimer, the term of this patent is extended or adjusted under 35 U.S.C. 154(b) by 291 days.

(21) Appl. No.: 14/763,008

(22) PCT Filed: Jan. 24, 2014

(86) PCT No.: PCT/US2014/013071
§ 371 (c)(1),
(2) Date: Jul. 23, 2015

(87) PCT Pub. No.: WO2014/117039
PCT Pub. Date: Jul. 31, 2014

(65) Prior Publication Data
US 2015/0373124 A1    Dec. 24, 2015

Related U.S. Application Data (60) Provisional application No. 61/756,397, filed on Jan. 24, 2013, provisional application No. 61/764,953, filed on Feb. 14, 2013.

(51) Int. Cl.
*H04L 29/08* (2006.01)
*H04W 4/70* (2018.01)
*H04L 29/06* (2006.01)

(52) U.S. Cl.
CPC ............ *H04L 67/141* (2013.01); *H04L 67/16* (2013.01); *H04L 67/30* (2013.01); *H04L 69/08* (2013.01); *H04W 4/70* (2018.02)

(58) Field of Classification Search
CPC ....... H04L 67/141; H04L 67/16; H04L 67/30; H04L 69/08; H04W 4/005
See application file for complete search history.

(56) References Cited

U.S. PATENT DOCUMENTS

2007/0169107 A1*  7/2007  Huttunen ................ H04L 29/06
                                                                   717/174
2008/0153521 A1   6/2008  Benaouda et al.
(Continued)

FOREIGN PATENT DOCUMENTS

EP    2 192 807 A1    6/2010
JP    2002-501240 A   1/2002
(Continued)

OTHER PUBLICATIONS

European Search Report dated Jan. 27, 2016 for European Application No. 14742936.9, filed Jan. 24, 2014 (9 pages).
(Continued)

*Primary Examiner* — Philip J Chea
*Assistant Examiner* — Robert B McAdams
(74) *Attorney, Agent, or Firm* — Perkins Coie LLP (57) ABSTRACT

Techniques for facilitating Machine-to-Machine (M2M) communications include providing an M2M system that implements one or more pre-defined M2M Application Programming Interface (API) profiles, providing a network interface for the M2M system, receiving a profile query over the network interface, and responding with information about the implemented one or more-pre-defined M2M API profiles.

15 Claims, 6 Drawing Sheets

(56) References Cited

U.S. PATENT DOCUMENTS

| | | | |
|---|---|---|---|
| 2010/0057485 A1* | 3/2010 | Luft | H04W 4/00 455/411 |
| 2012/0198520 A1* | 8/2012 | Cha | H04L 63/20 726/3 |
| 2012/0203894 A1* | 8/2012 | Lee | H04W 8/18 709/224 |
| 2012/0231828 A1 | 9/2012 | Wang et al. | |
| 2013/0017827 A1* | 1/2013 | Muhanna | H04W 4/005 455/426.1 |
| 2013/0188515 A1* | 7/2013 | Pinheiro | H04L 67/16 370/254 |
| 2013/0198838 A1* | 8/2013 | Schmidt | H04L 9/3234 726/22 |
| 2013/0212236 A1* | 8/2013 | Foti | H04W 4/005 709/221 |
| 2014/0044034 A1 | 2/2014 | Park et al. | |
| 2014/0122699 A1* | 5/2014 | Hughes | H04W 4/003 709/224 |
| 2016/0014543 A1* | 1/2016 | Kulkarni | H04W 4/005 455/419 |

FOREIGN PATENT DOCUMENTS

| | | |
|---|---|---|
| KR | 10-2013-0004497 A | 1/2013 |
| WO | 1999/035787 A2 | 7/1999 |
| WO | 2011/112683 A1 | 9/2011 |
| WO | 20121150797 A2 | 11/2012 |

OTHER PUBLICATIONS

Korean Office Action dated Mar. 22, 2016 for Korean Application No. 10-2015-7022750, filed Jan. 24, 2014 (8 pages).

Sneps-Sneppe, M., et al., "About M2M standards and their possible extensions," 2012 2nd Baltic Congress on Future Internet Communications, pp. 187-193, Apr. 2012.

Tack Finallzte et al., "While the role of different ?players? in the E2E M2M ecosystem is recognized, it is important for oneM2M to provide the capability for such M2M industry players to be able to integrate their systems and services seamlessly, independent of the development platform and independent of the players they", vol. WG2—Architecture, ARC, Feb. 26, 2013 (Feb. 26, 2013), XP084000854, Retrieved from the Internet <URL:URL = http://member.onem2m.org/Application/documentapp/downloadimmediate/default.aspx?docID=1030> [retrieved on Feb. 26, 2013].

International Search Report and Written Opinion dated May 19, 2014 for International Application No. PCT/US2014/013071, filed Jan. 24, 2014 (8 pages).

Open Mobile Alliance Ltd. (OMA) "OMA-TS-REST_NetAPI_OneAPIProfile-V3_0-20120327-C" OneAPI Profile of RESTful Network APIs, Version 3.0, 21 pages, Mar. 2012.

Japanese Office Action dated Mar. 12, 2019 for Japanese Application No. 2017-145039, filed Jul. 27, 2017 (6 pages).

Indian First Examination Report dated Oct. 9, 2019 for Indian Patent Application No. 2689/KOLNP/2015, filed Aug. 14, 2015 (7 pages).

Japanese Office Action dated Nov. 5, 2019 for Japanese Application No. 2017-145039, filed Jul. 27, 2017 (4 pages).

* cited by examiner

COMMUNICATION BETWEEN MACHINE-TO-MACHINE SERVICE LAYERS AND TRANSPORT NETWORK

CROSS REFERENCE TO RELATED APPLICATIONS

This patent document claim the benefit of priority of U.S. Provisional Patent Application No. 61/756,397, filed on Jan. 24, 2013, and U.S. Provisional Patent Application No. 61/764,953, filed on Feb. 14, 2013. The entire contents of the before-mentioned patent applications are incorporated by reference herein.

BACKGROUND

This document relates to machine-to-machine (M2M) communication.

M2M communication includes communication between two different devices, which is not explicitly triggered by a user. Devices may perform M2M communication using wired or wireless connectivity. The communication is typically initiated by an application residing on one of the machine to gather or send information to a counterpart application on the other machine. Present day M2M communication techniques are not able to reap all the benefits offered by this technology due to the challenges faced in vertical integration of different layers of the protocol stack in typical M2M solution implementations.

SUMMARY

This document describes technologies, among other things, for facilitating ubiquitous communication between M2M devices. To facilitate interoperability, Application Programming Interface (API) profiles are defined. The API profiles may include common tasks such as discovering whether a device is on or off, and specialized tasks, such as being able to query specific variables (e.g., current battery power or a temperature reading, etc.).

In one aspect, methods, systems and apparatus for facilitating M2M communications include providing an M2M system that implements one or more pre-defined Machine-to-Machine (M2M) Application Programming Interface (API) profiles, providing a network interface for the M2M system, receiving a profile query over the network interface, and responding with information about the implemented one or more-pre-defined M2M API profiles.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

Service Layer specifications developed by organizations such as oneM2M, ETSI TC M2M, TIA TR-50 etc. (M2M SDOs) need to support efficient deployment of M2M Solutions by a wide range of market-focused (vertical) organizations. With the focus on the Service Layer, such organizations have been taking transport network-independent view of the end-to-end services. Yet, they need to make sure that their Service Layer specifications can be used effectively for interfacing with different types of transport networks. Such transport networks include but are not limited to the wireless and wireline networks being defined by 3GPP, 3GPP2, IEEE, IETF and BBF.

Organizations developing transport network specifications have been providing enhancements and optimizations for their networks for supporting M2M services. Some transport network standards development committees, such as the 3GPP and the 3GPP2 have taken a Service Layer independent approach while defining architectural enhancements for supporting M2M services. The 3GPP and the 3GPP2 have defined a set of M2M deployment scenarios also for facilitating different business models. Such deployment scenarios have evolved from the types of services offered and from the nature of interactions between different "players" in the M2M ecosystem.

While recognizing the role of different "players" in the E2E M2M ecosystem, it is important for M2M SDOs (standards developing organizations) to provide the capability for such M2M industry players to be able to integrate their systems and services seamlessly, independent of the development platform and independent of the players they are interacting with. It should not be necessary for such players to know the protocol details and technical nuances of their interacting peers. It should also be possible for such players in the M2M ecosystem to be able to continue to support their existing deployments as they migrate their systems towards the relevant industry standards.

This document discloses an M2M Services stack, wherein different "layers" characterize different players in the M2M ecosystem. The services stack and the associated framework suggests the nature of the "glue" for integrating the capabilities provided by different layers in the M2M Services stack. An approach for developing solutions for integrating the Transport Network layer with the M2M Service layer components of the M2M Services stack is also disclosed.

Figure 1:
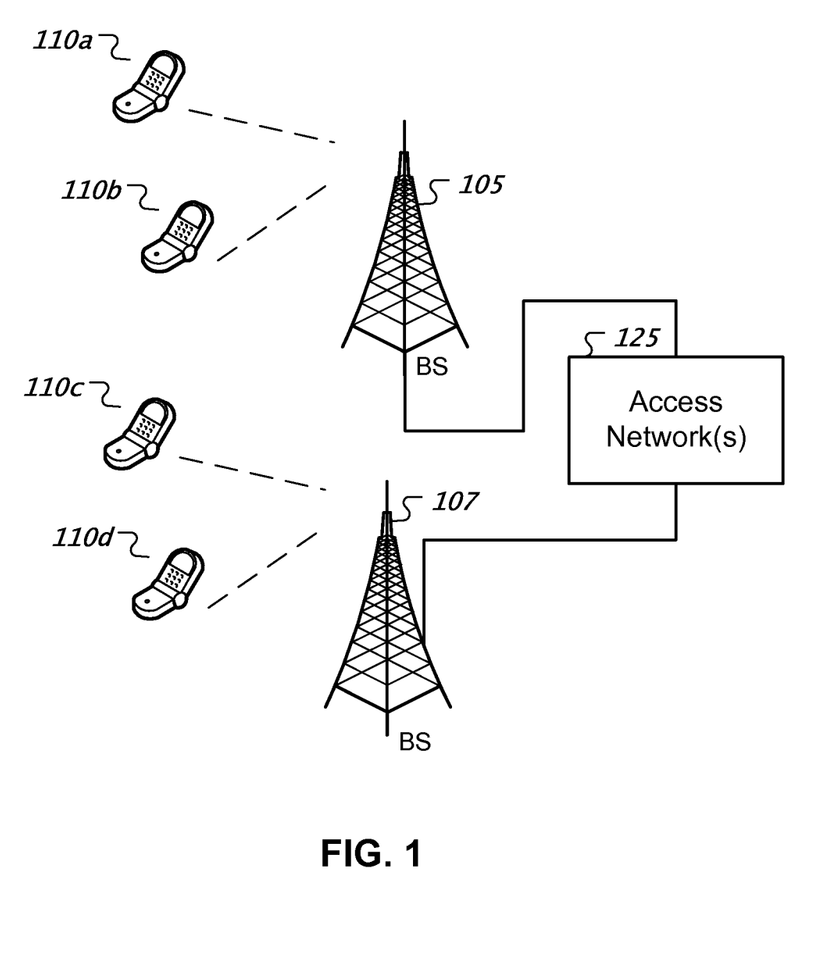
FIG. 1 depicts example wireless network architecture.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
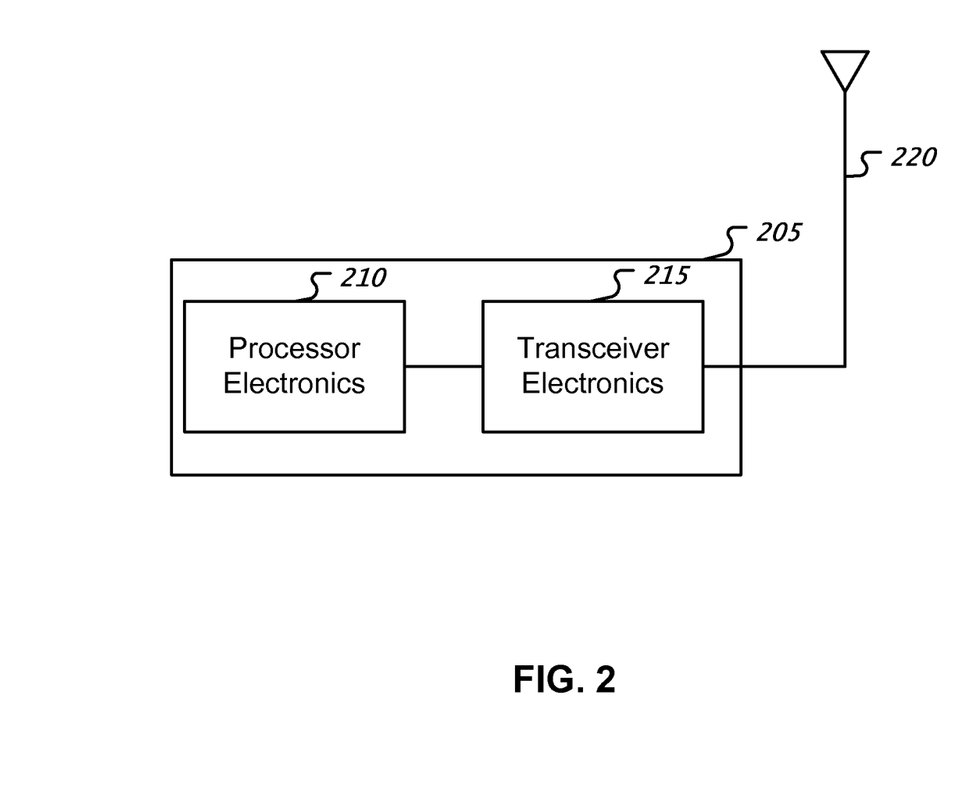
FIG. 2 is a block diagram of a radio device operable in a wireless network.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA or GSM based air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA2000 1x, HRPD, WiMAX, GSM, LTE, and Universal Mobile Telecommunications System (UMTS).

In some implementations, a radio station 205 may additionally be configured with a local area network connectivity such as a 802.11 (a/b/g/n) interface. The availability of such an interface may make it possible to communicatively couple the radio station 205 to the Internet via the local area connection. For example, a user may access services over her user equipment (UE) by connecting to the service via a wireless local area network connection (e.g., home Wi-Fi access) through a fixed broadband network such as a cable modem network or a DSL network.

Layered View of End-to-End Services

Figure 3:
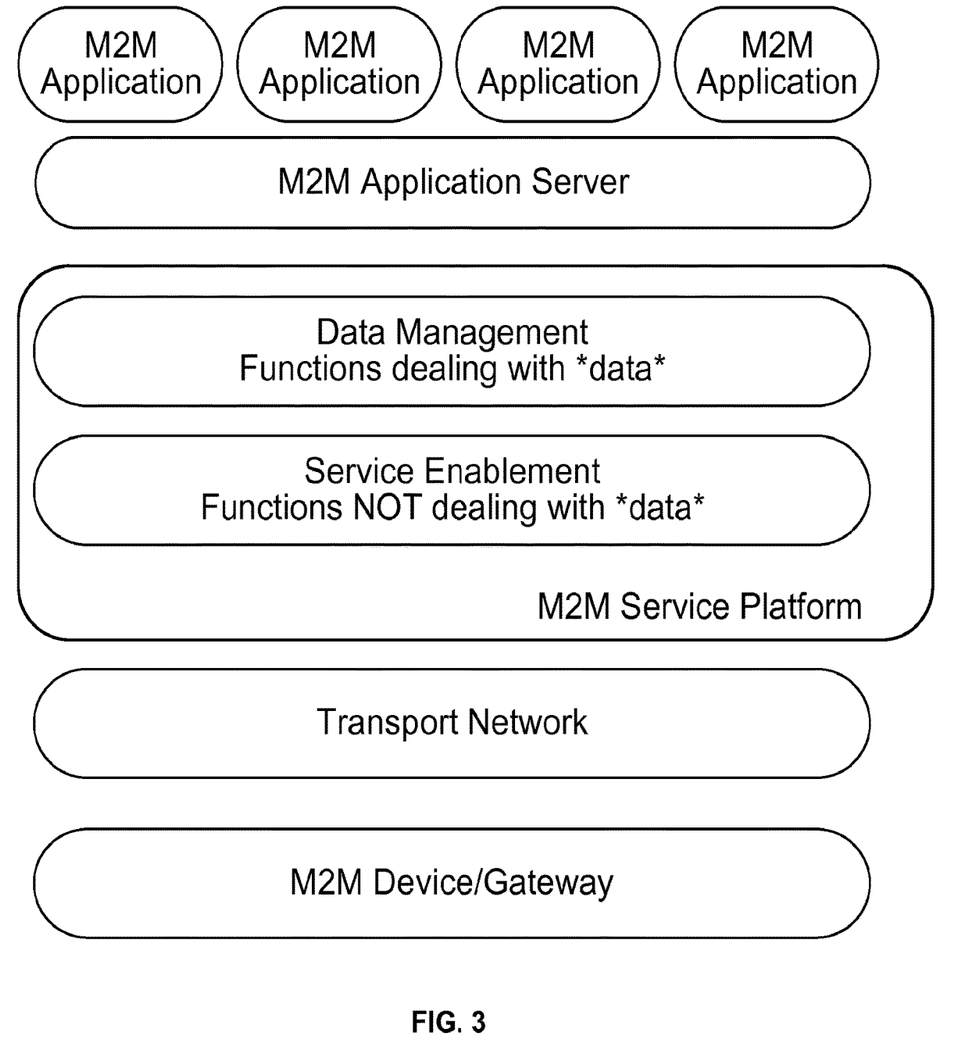
FIG. 3 depicts an example of a layered view of e2e M2M services.

FIG. 3 depicts an example of looking at different players is the M2M ecosystem will be a "layered view" of end-to-end (e2e) M2M Services. Such layered e2e view typically comprises of M2M Applications hosted by the M2M Application Server (AS) and the M2M Devices/Gateways. In this layered view, the M2M Service Platform (M2M SP) provides M2M Data Management and/or M2M Service Enablement capabilities. The underlying Transport Network provides transport and communication services for the data flow between the M2M Applications hosted by the M2M Devices/Gateways and the Application Server(s).

With such layered view of M2M services, the M2M Application Server, M2M Device/Gateway, M2M Service Platform and the Transport Network can be considered as different "layers" in the e2e M2M Services stack. Each of these "layers" can also be considered as a representation of different business entities. Each layer provides a set of capabilities, and a set of Interfaces and/or APIs for communicating with other layers. The "layers" can be stacked differently for supporting different services and different business models. Different stacking of these "layers" is representative of different deployment scenarios, and the associated requirements for supporting different types of Interfaces and/or APIs between the communicating layers.

Figure 4A:
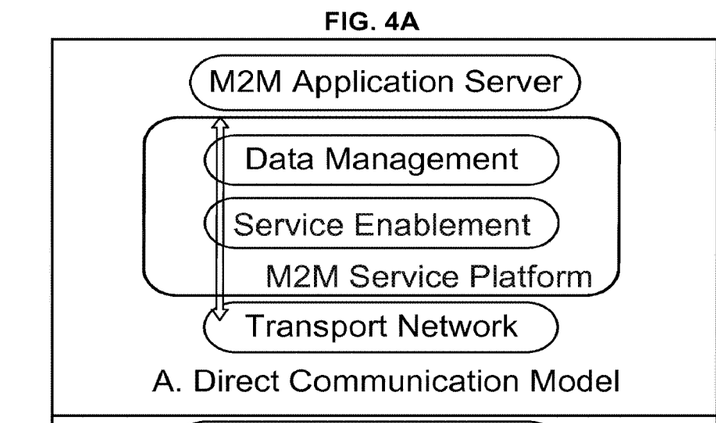
FIGS. 4A, 4B, 4C and 4D depict examples of M2M service stacks.

FIG. 4A, is an example of the M2M Services stack represents the "direct" communication model, wherein the AS communicates directly with the Transport Network without the use of any M2M Service Platform. The applications at the AS make use of the services offered by the Transport Network. The services offered by the Transport Network can be abstracted via a set of APIs that are specific to the Transport Network. Such APIs can be defined and made available to the application developers by the operator of the Transport Network, or they can be a set of Open APIs specified by some organization e.g., M2M SDOs, OMA etc., and/or be a combination of the network-operator-defined and Open APIs.

Figure 4B:
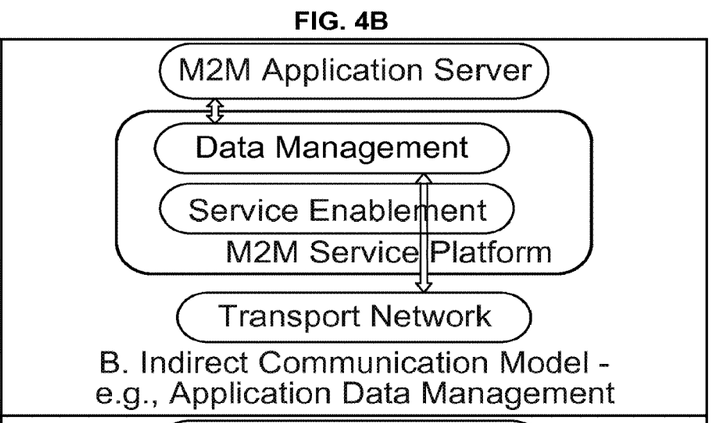
Figure 4C:
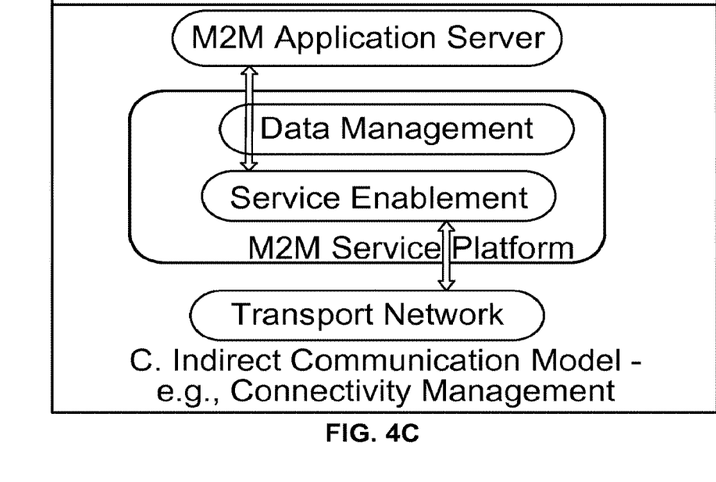
Figure 4D:
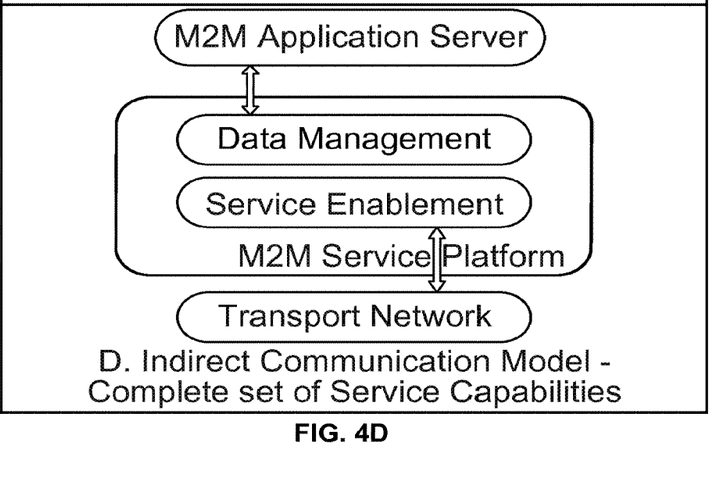
Figure 5:
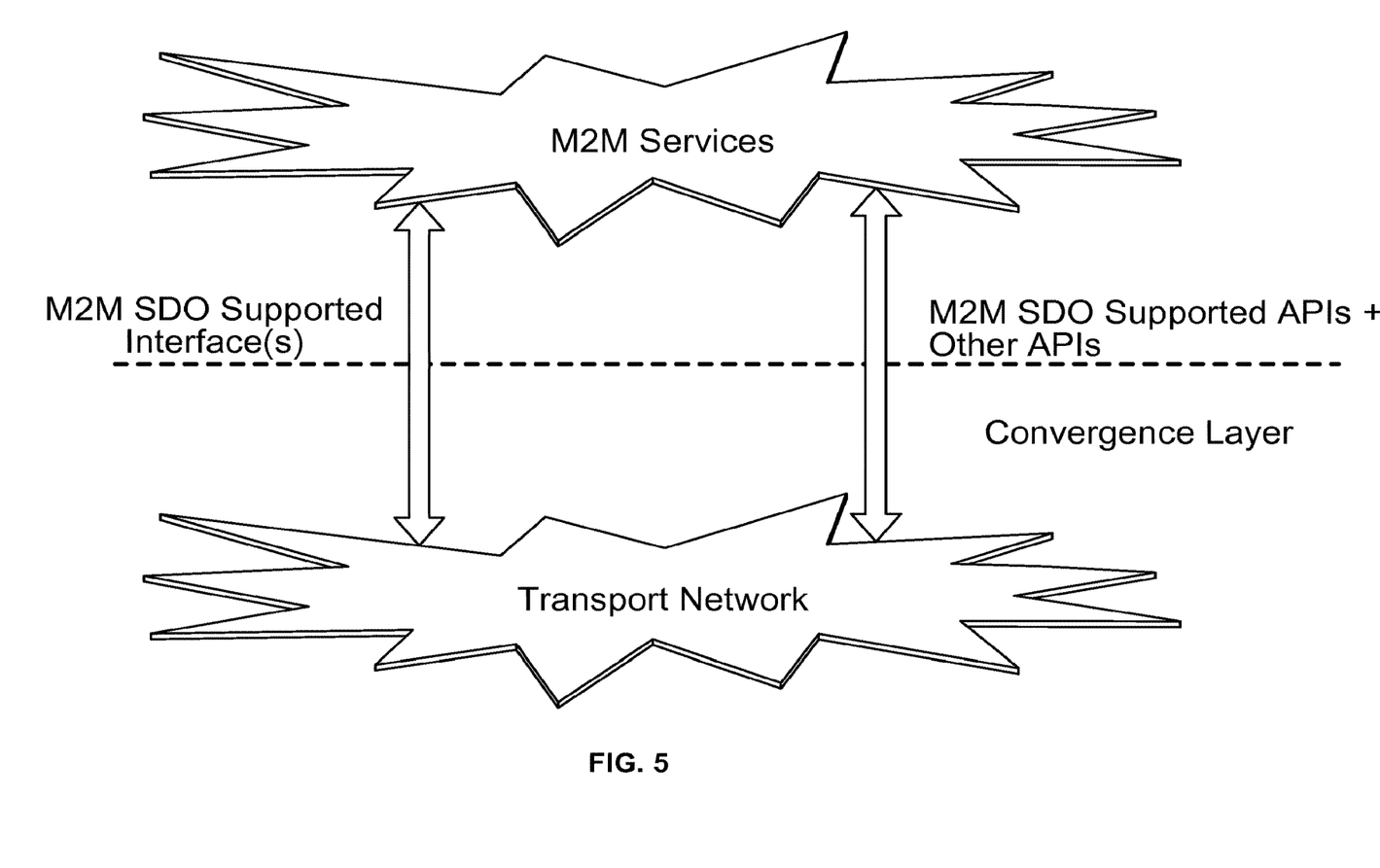
FIG. 5 depicts examples of interfaces and APIs supported by M2M SDOs.

FIG. 4B, FIG. 4C and FIG. 4D are examples of the "indirect" communication model, wherein the applications at the AS communicate with the Transport Network through the services provided by the M2M Service Platform. Such M2M Service Platform provided capabilities and services can include services like Application Data Management, Device Management, Connectivity Management etc. Such capabilities and services, as in this example illustration, can be abstracted via a set of Interfaces and/or APIs exposed by the Data Management sub-layer and the Services Enablement sub-layer respectively. It is envisioned that M2M SDOs and their Partner organization will be taking the lead in identifying and specifying such Interfaces and/or APIs.

A "hybrid" communication model can also be supported, though not illustrated in FIG. 4A to 4D. In the "hybrid" communication model, the AS uses the "direct" model for communicating with the Transport Network for the transport of user data traffic. At the same time, the AS uses the services provided by the M2M Service Platform also for value added services, such as services relating to device management, device triggering etc. Similar to the "direct" and "indirect" communication models, communication between different "layers" in the "hybrid" communication model makes use of the Interfaces and/or APIs supported by the peer communicating layers.

Role of M2M SDOs

With their focus on the Service Layer, M2M SDOs are expected to take transport-network-independent view of the end-to-end services. Yet, M2M SDOs should to make sure that their Service Layer specifications can be used effectively for interfacing with different type of transport networks.

With such transport-network-independent approach, the M2M Services stack can be broadly illustrated as two independent set of capabilities: the capabilities provided by the Transport Network layer and the capabilities provided by the M2M Services layer. It is envisioned that these two layers provide a set of Interfaces and/or APIs that expose their capabilities and resources for use by the peer entity for effective communications.

The set of capabilities provided by these two "layers" may be provided by the same business entity or by different business entities. In the scenario where one business entity provides both set of capabilities, the associated Interfaces and/or APIs can be internal to such business entity. Such scenario is not the subject of discussions here. When the capabilities provided by these two layers are provided by different business entities, it is desirable to define a standardized set of Interfaces and/or APIs that can be used by the peer layers for communicating effectively.

Though the capabilities provided by the M2M Services layer (e.g., M2M Service Platform) is transport-network-independent, the M2M Services layer should have the knowledge of the protocols and nuances of the underlying Transport Network. Therefore, the set of Interfaces and/or APIs between the M2M Service layer and the Transport Network layer should be specific to the technology supported by the underlying Transport Network. For the purpose of discussions and for ease of ready reference; each set of Transport Network specific Interfaces and/or APIs is referred here as the Transport Network specific Convergence Layer.

The Convergence Layer

The definition of a Transport Network specific Convergence Layer includes specifying a set of Interfaces and/or a set of APIs. Such Transport Network specific Convergence Layer should be defined via a collaborative effort between M2M SDOs and the organization responsible for specifying the associated transport network technology. For example, the 3GPP and 3GPP2 have identified Tsp and M2Msp as the interface between the M2M Services Platform and the respective 3GPP and 3GPP2 networks. Such interfaces (Tsp and M2Msp) should be defined via a collaborative effort between M2M SDOs and the 3GPP/3GPP2, and are not the subject of discussions in this paper. The subject of discussions here is the approach M2M SDOs take for defining a set of APIs that can be used between the M2M Service Platform (abstracted as the M2M Service layer) and the underlying Transport Networks.

Open Network APIs

M2M SDOs may provide a set of capabilities for supporting efficient deployment of M2M Solutions by a wide range of market-focused (vertical) organizations. In order to avoid proliferation of proprietary APIs and consequent industry fragmentation, it is desirable for the developers of M2M applications and the M2M Service Platform to have access to a known set of capabilities of the underlying transport networks in a standardized way, without the need for them to have the knowledge of protocols and the technological nuances of such network(s).

As an illustration, OMA (Open Mobile Alliance) network APIs allow transport networks to provide an abstract view of the capabilities and resources in their networks in an open and programmable way. This reduces the development costs and the time needed to create application and content—independent of the development platform and independent of the operators and service providers that support OMA APIs.

Similarly, the GSMA OneAPI project has been collaborating with OMA for simplifying the Parlay X Web APIs, and improving them by providing RESTful bindings and by providing a choice of simpler JSON/XML responses. The resulting GSMA OneAPI profiles is a set of APIs that expose information about mobile network capabilities and resources to application developers via Web applications. The application developers, for example, can then invoke a single Web Service request to get the location of a device in a mobile network and initiate a voice call. Such applications can be ported across network types and network technologies. In addition to simplifying application development, some other benefits of OneAPI profile include:

OneAPI profiles do not require network operators to discard the APIs that they are already providing. OneAPIs can coexist with other API services.

OneAPI profiles provide a basis for the network operators to service each other's API requests, for example to fulfil a location request for a roaming visitor for another operator.

With OneAPI profiles the operators do not have to invest their own time and effort designing APIs for the developers to use.

There are economies of scale gained with the benefit from common vendor implementations of OneAPI profiles The proposal here is for M2M SDOs to take an approach similar to the OneAPI initiative. M2M SDOs to work with Partners and organizations (e.g., OMA) to develop a set of M2M API profiles that can be used by the M2M Application developers and developers of the M2M Service Platform. Such set of M2M API profiles will result in reduced effort and time for the developers for creating M2M applications and content. Such applications will also be portable across different market-focused (vertical) organizations and across transport network operators. Such set of M2M API profiles will also allow transport network operators to integrate their networks seamlessly with the M2M Service Platform from multiple equipment vendors.

That said, it is envisioned that M2M SDOs can take a leaf out of the work being done by the GSMA OneAPI initiative and examine the OneAPI profiles. GSMA OneAPI profiles can then augmented by defining M2M specific API profiles that abstract the transport network capabilities that are required for M2M services. An analysis of the gaps between the capabilities provided by the available set of OneAPI profiles, and the capabilities that are needed for a comprehensive implementation of M2M SDO specified Service Layer will lead to the areas that need focus. Such identified focus areas and gaps can be addressed by M2M SDOs independently and/or via collaborative efforts with Partners and industry organizations (e.g., OMA, BBF etc.) by developing a more complete suite of M2M API profiles.

Annex—Status of GSMA OneAPI Profiles

GSMA OneAPI project has been collaborating with OMA for simplifying Parlay X Web APIs and improving them by providing corresponding RESTful bindings. Starting with Version 1 of OneAPIs that had focus on network capabilities such as Payment, Location and Messaging; Version 2 of GSMA OneAPI added capabilities for determining Device Capabilities, Bearer Identification and Voice/Call Service. Version 3 is looking at more advanced capabilities, such as QoS, Video Call, Identity, Femtocell Support etc.

The following is a list of the APIs within OneAPI profiles. Actual mobile operator's support for any of the APIs is dependent on operator network capability.

Payments:
Charge a user
Refund a user
Reserve funds for subsequent charge
Increase reservation
Charge against reservation
Release reservation
SMS:
Send SMS
Query SMS delivery status
Start subscription of SMS delivery status
Stop subscription of SMS delivery status
Receive SMS
Start subscription of SMS receipt
Stop subscription of SMS receipt
MMS:
Send MMS
Query MMS delivery status
Start subscription for MMS delivery status
Stop subscription for MMS delivery status
Receive MMS message list
Receive full MMS message (content)

Start subscription for MMS receipt
Stop subscription for MMS receipt
Location:
Query location of mobile terminal(s)
Voice Call Control:
Create a call between two or more parties
Add or remove participants from the call
Get information about the participants
Get information about an existing call
End a call
Subscribe to notifications of certain events within calls
View your notification criteria
Stop receiving notifications
Play an audio message
Stop an audio message
Get the status of an audio message (to whom it has been played)
Play an audio file to call participants and collect their keypad interactions
Terminate an audio message/keypad interaction
Be notified of any keypad interaction from participants to your audio message
Stop receiving keypad notifications
Data Connection Profile:
Request the connection type (3G, GPRS etc.) of the terminal
Retrieve the roaming status of the terminal
Device Capability:
Get the device capability of a mobile account
OMA document "OMA-TS-REST_NetAPI_OneAPIProfile-V3_0-20120327-C" is the candidate Version 3.0 of OneAPI Profile of RESTful Network APIs. As has been stated earlier, GSMA OneAPI project has been addressing deployment and operational considerations for 3rd party applications and has been using a subset of Parlay X and OMA RESTful Network APIs for abstracting the OneAPI profile of RESTful Network APIs.

Version 3.0 of the OneAPI Profile of RESTful Network APIs defines subsets of the following APIs:
RESTful Network API for Short Messaging V 1.0
RESTful Network API for Messaging V 1.0
RESTful Network API for Terminal Location V 1.0
RESTful Network API for Payment V 1.0
RESTful Network API for Device Capabilities V 1.0
RESTful Network API for Terminal Status V 1.0
RESTful Network API for Third Party Call V 1.0, Call Notification V 1.0 and Audio Call V 1.0 (jointly referred to as Call Control APIs)

Figure 6:
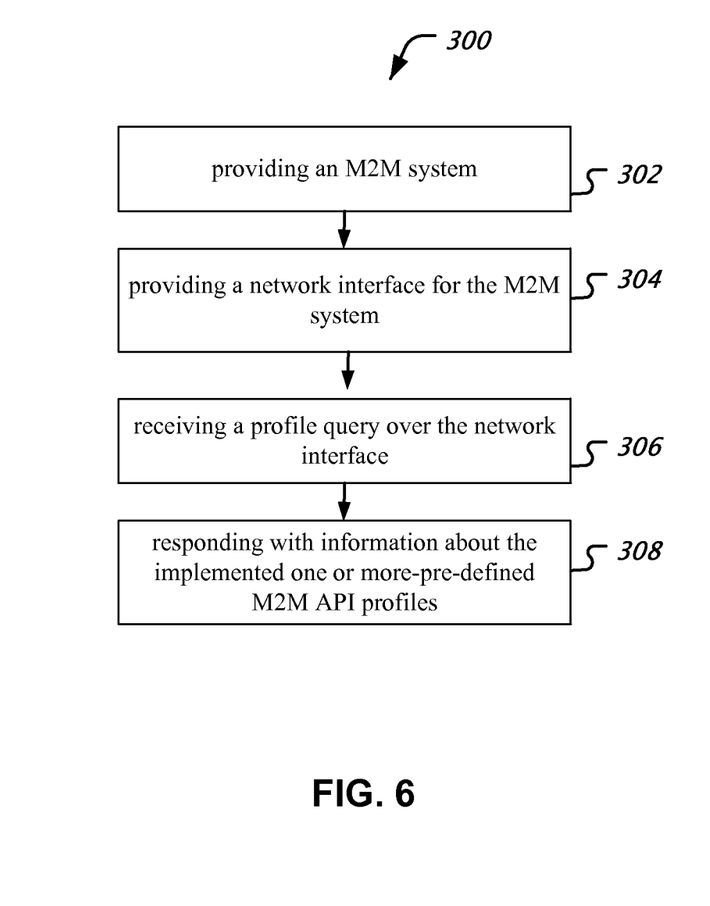
FIG. 6 is a flowchart representation of a process of facilitating M2M communication.

FIG. 6 is a flow chart representation of a process 300 for facilitating Machine-to-Machine (M2M) communication.

At 302, an M2M system is provided. The M2M system may be provided, e.g., by a developer, a manufacturer, a service provider or a network operator for use and deployment in a wired or wireless network. The M2M system implements one or more pre-defined Machine-to-Machine (M2M) Application Programming Interface (API) profiles. These profiles may be defined by one or more of the industry standards or initiatives, e.g., as described in Appendix A.

At 304, the provider of the M2M system may provide a network interface for the M2M system. The network interface is provided by designing, manufacturing, installing the network interface. Additionally, the network interface may be provided by authorizing the M2M system to work in a given network (e.g., configuration, subscription, service agreements etc.).

At 306, the M2M system may receive a profile query over the network interface. The query is received, e.g., from another M2M system in the network.

At 308, the M2M system responds with information about the implemented one or more-pre-defined M2M API profiles.

In some implementations, the one or more M2M API profiles are implemented to include a first module that is agnostic to a transmission protocol used for the network interface and a second module that transmits and receives signals using the transmission protocol used for the network interface.

In some implementations, the process 300 further includes storing, in a management information database (MIB), information corresponding to one of the one or more pre-defined M2M API profiles. The MIB may be implemented in the form of a group of individually addressable memory locations at a local memory. The MIB entries may include entries such as transaction history, hardware identification parameters, alarm conditions, whether or not errors are maskable, sleep mode behavior (e.g., how often and how long can the device sleep), and so on.

In some implementations, the information may be made readable/writeable by another system, based on rules specified in the one or more pre-defined M2M API profiles.

Figure 7:
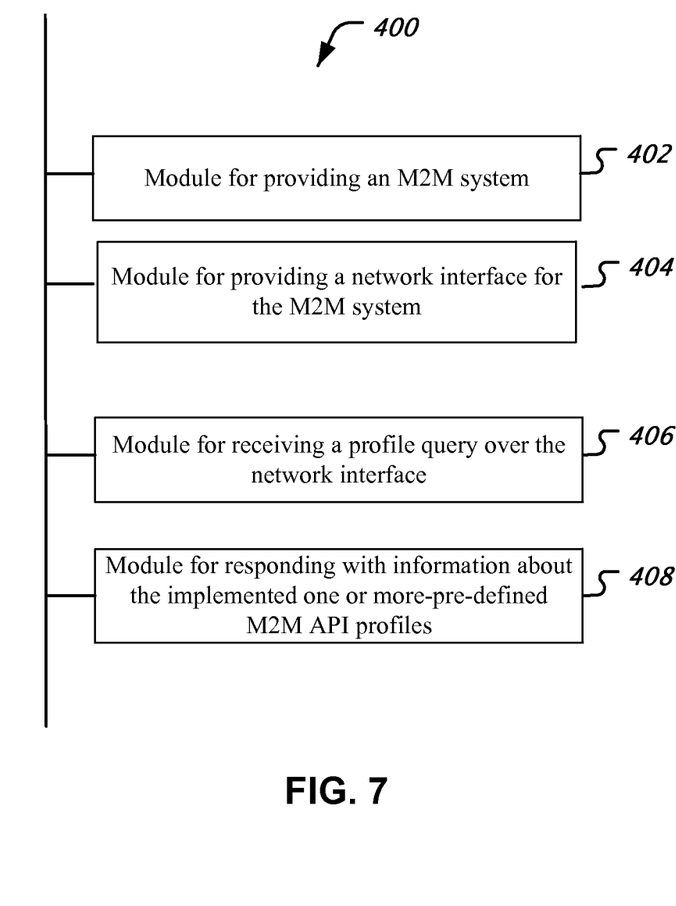
FIG. 7 depicts a block diagram representation of a portion of an M2M system.

FIG. 7 is a block diagram representation of an apparatus 400 for facilitating Machine-to-Machine (M2M) communication. The module 402 is for providing an M2M system that implements one or more pre-defined Machine-to-Machine (M2M) Application Programming Interface (API) profiles. The module 404 is for providing a network interface for the M2M system. The module 406 is for receiving a profile query over the network interface. The module 406 is for responding with information about the implemented one or more-pre-defined M2M API profiles.

In some implementations, a system for M2M communications may be operated based on the techniques disclosed in this document. The system includes a first M2M system communicatively coupled to a second M2M system over a network. The first M2M system is configured to transmit an M2M Application Programming Interface (API) query to receive M2M API capabilities of the second M2M system. The second M2M system is configured to communicate M2M API capabilities over the network.

In some implementations, the service layers may further include the ability to provide a service layer update information. For example, in one operational scenario, Machine 1 contacts Machine 2 to accomplish some task (e.g., to request changes to a light controlled by Machine 2). Based on the service layer API profile provided by Machine 2, Machine 1 understands that Machine 2 is able to turn the light on or off, but is not capable of dimming the light. Machine 1 may then provide resource information to Machine 2 which indicates information about where Machine 2 can get code update to enhance its functionality. The code update may specify amount of execution and storage memory that the machine should have. An M2M API profile providing server may be contacted by Machine 2, which then obtains the new functionality from the server. Upon reception of the new functionality, Machine 2 may then contact Machine 1 to complete the requested task of dimming lights. In some implementations, this entire procedure is implemented by M2M communication, i.e., without any human intervention.

It will be appreciated that techniques are disclosed for operating M2M systems by implementing API service profiles that enable easy deployments of these devices in different application areas.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for facilitating Machine-to-Machine (M2M) communication, the method comprising:
receiving, by a first peer M2M system, a profile query over the network interface from a second peer M2M system, wherein the first peer M2M system implements one or more standardized Machine-to-Machine (M2M) Application Programming Interface (API) profiles, and wherein the one or more standardized M2M API profiles describe functionalities that are provided by a M2M service platform as a representation of multiple business entities, the M2M service platform comprising a first layer configured to provide transport network services via a first set of standardized APIs and a second layer configured to provide capabilities for a plurality of tasks that include common tasks and specialized tasks to enable data flow between the first peer M2M system and the second peer M2M system, the second layer further configured to provide transport network services via a second set of standardized APIs to allow the first and second peer M2M systems to use the transport network services directly via the first set of standardized APIs or indirectly through the second layer via the second set of standardized APIs; and
responding, by the first M2M system, with information about the implemented one or more standardized M2M API profiles that describe the functionalities regardless of which one of the multiple business entities provides the functionalities, the method further including, without any human intervention:

receiving, by the first M2M system from the second peer M2M system, information about where to obtain a software update for a functionality not currently implemented, receiving the new functionality by contacting a server for the software update and receiving the software update from the server based on the information from the second peer M2M system, and completing a requested task based on the received new functionality.

2. The method of claim 1, wherein the first layer is agnostic to a transmission protocol used for the network interface and the second layer is configured to transmit and receive signals using the transmission protocol used for the network interface.

3. The method of claim 1, further including:

storing, in a management information database (MIB), information corresponding to one of the one or more pre-defined M2M API profiles.

4. The method of claim 3, further including:

making the information readable/writeable by another peer M2M system, based on rules specified in the one or more pre-defined M2M API profiles.

5. An apparatus for facilitating Machine-to-Machine (M2M) communication, comprising a processor and a memory that comprises instructions stored thereupon, where the instructions when executed by the processor configure the processor to:

receive a profile query over the network interface from a peer M2M system, wherein the first peer M2M system implements one or more standardized Machine-to-Machine (M2M) Application Programming Interface (API) profiles, and wherein the one or more standardized M2M API profiles describe functionalities that are provided by a M2M service platform as a representation of multiple business entities, the M2M service platform comprising a first layer configured to provide transport network services via a first set of standardized APIs and a second layer configured to provide capabilities for a plurality of tasks that include common tasks and specialized tasks to enable data flow between the apparatus and the peer M2M system, the second layer further configured to provide transport network services via a second set of standardized APIs to allow the apparatus and the peer M2M system to use the transport network services directly via the first set of standardized APIs and indirectly through the second layer via the second set of standardized APIs; and respond with information about the implemented one or more standardized M2M API profiles that describe the functionalities regardless of which one of the multiple business entities provides the functionalities, the processor is further configured to:

receive, from the peer M2M system, information about where to obtain a software update for a functionality not currently implemented, receive the new functionality by contacting a server for the software update and receiving the software update from the server based on the information from the second peer M2M system; and complete a requested task based on the received new functionality.

6. The apparatus of claim 5, wherein the first layer is agnostic to a transmission protocol used for the network interface and the second layer is configured to transmit and receive signals using the transmission protocol used for the network interface.

7. The apparatus of claim 5, wherein the instructions further configure the processor to:

store, in a management information database (MIB), information corresponding to one of the one or more pre-defined M2M API profiles.

8. The apparatus of claim 7, wherein the instructions further configure the processor to:

make the information readable/writeable by another peer M2M system, based on rules specified in the one or more pre-defined M2M API profiles.

9. A computer program product comprising a non-transitory, computer-readable medium having code stored thereon, the code, when executed by a processor, causing the processor to implement a method comprising:

receiving, by a first peer M2M system, a profile query over the network interface from a second peer M2M system, wherein the first peer M2M system implements one or more standardized Machine-to-Machine (M2M) Application Programming Interface (API) profiles, and wherein the one or more standardized M2M API profiles describe functionalities that are provided by a M2M service platform as a representation of multiple business entities, the M2M service platform comprising a first layer configured to provide transport network services via a first set of standardized APIs and a second layer configured to provide capabilities for a plurality of tasks that include common tasks and specialized tasks to enable data flow between the first peer M2M system and the second peer M2M system, the second layer further configured to provide transport network services via a second set of standardized APIs to allow the first and second peer M2M systems to use the transport network services directly via the first set of standardized APIs and indirectly through the second layer via the second set of standardized API; and responding, by the first M2M system, with information about the implemented one or more standardized M2M API profiles that describe the functionalities regardless of which one of the multiple business entities provides the functionalities, the method further including, without any human intervention:

receiving, by the first M2M system from the second peer M2M system, information about where to obtain a software update for a functionality not currently implemented, receiving the new functionality by contacting a server for the software update and receiving the software update from the server based on the information from the second peer M2M system; and completing a requested task based on the received new functionality.

10. The method of claim 2, wherein the second layer is transport-network-independent.

11. The apparatus of claim 6, wherein the second layer is transport-network-independent.

12. The computer program product of claim 9, wherein the first layer is agnostic to a transmission protocol used for the network interface and a second layer is configured to transmit and receive signals using the transmission protocol used for the network interface.

13. The computer program product of claim 12, wherein the second is transport-network-independent.

14. The computer program product of claim 9, wherein the method implemented by the processor further comprises:

storing, in a management information database (MIB), information corresponding to one of the one or more pre-defined M2M API profiles.

15. The computer program product of claim 14, wherein the method implemented by the processor further comprises:
making the information readable/writeable by another system, based on rules specified in the one or more pre-defined M2M API profiles.

\* \* \* \* \*